United States Patent [19]

Nagano

[11] Patent Number: 5,273,500
[45] Date of Patent: Dec. 28, 1993

[54] SELF-CONTAINED CHANGE SPEED APPARATUS FOR USE ON A BICYCLE AND HAVING A PLANETARY GEAR MECHANISM

[75] Inventor: Masashi Nagano, Izumi, Japan

[73] Assignee: Shimano, Inc., Osaka, Japan

[21] Appl. No.: 810,125

[22] Filed: Dec. 19, 1991

[30] Foreign Application Priority Data

Dec. 28, 1990 [JP] Japan ................... 2-408582

[51] Int. Cl.⁵ .............................. F16H 3/44
[52] U.S. Cl. .................... 475/312; 475/296; 475/297; 192/6 A
[58] Field of Search .......... 475/312, 296, 297; 192/6

[56] References Cited

U.S. PATENT DOCUMENTS

| | | | |
|---|---|---|---|
| 2,218,838 | 10/1940 | Alspaugh | 475/296 X |
| 4,400,999 | 8/1983 | Steuer | 475/297 X |
| 4,628,769 | 12/1986 | Nagano | 475/297 X |
| 4,651,853 | 3/1987 | Bergles | 475/297 X |
| 4,721,013 | 1/1988 | Steuer et al. | 192/6 A X |
| 4,727,965 | 3/1988 | Zach et al. | 475/297 X |

FOREIGN PATENT DOCUMENTS

| | | |
|---|---|---|
| 383350 | 8/1990 | European Pat. Off. . |
| 3732977 | 4/1989 | Fed. Rep. of Germany . |
| 2166502 | 5/1986 | United Kingdom . |
| 2166503 | 5/1986 | United Kingdom . |

*Primary Examiner*—Leslie A. Braun
*Assistant Examiner*—Daniel Wittels
*Attorney, Agent, or Firm*—Dickstein, Shapiro & Morin

[57] ABSTRACT

A self-contained change speed apparatus for use on a bicycle having a drive member and a hub body rotatably supported on a fixed shaft, and two planetary gear mechanisms arranged on a drive transmission path extending from the drive member to the hub body. The planetary gear mechanisms include planet gears meshed with sun gears switchable through externally controllable one-way clutches between a state of free rotation relative to the fixed shaft and a state of being locked to the fixed shaft. The controls of the one-way clutches acting on the sun gears are effected by relative positional relations between projections formed on the fixed shaft and control sections formed on a control member shiftable on peripheral surfaces of the fixed shaft. Such controls of the sun gears determine an output line extending through one of the two one-way clutches.

13 Claims, 19 Drawing Sheets

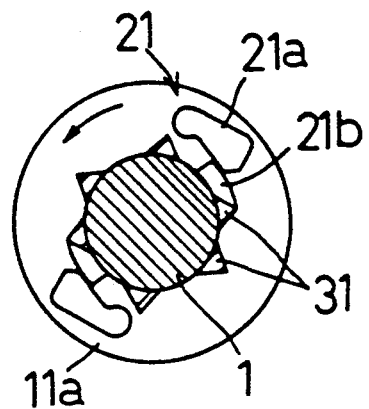
FIG. 10A (H3)
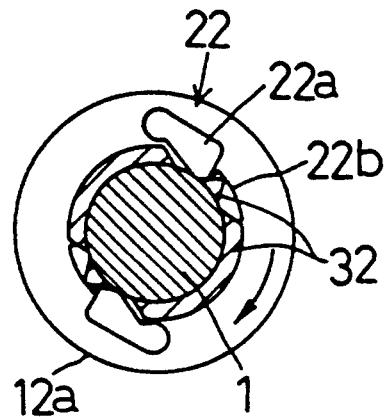
FIG. 10B (H3)
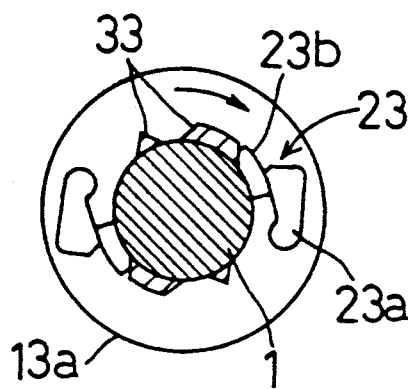
FIG. 10C (H3)
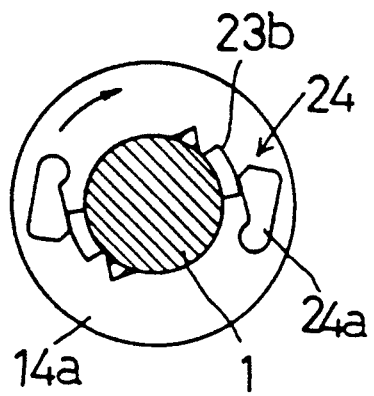
FIG. 10D (H3)

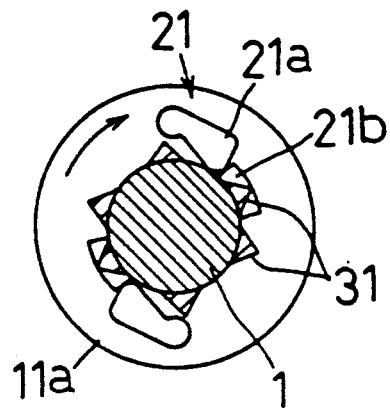
FIG. 11A(H2)
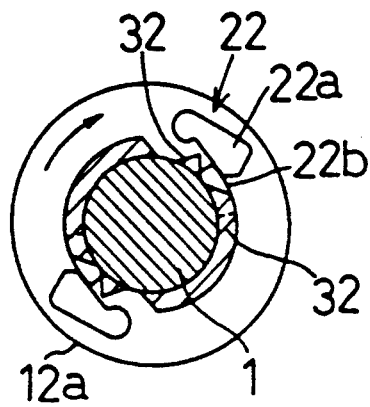
FIG. 11B(H2)
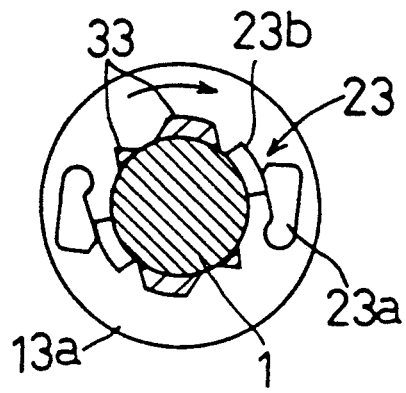
FIG. 11C(H2)
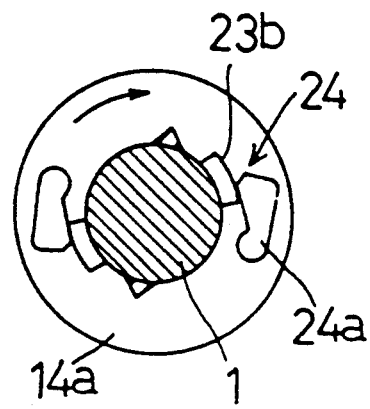
FIG. 11D(H2)

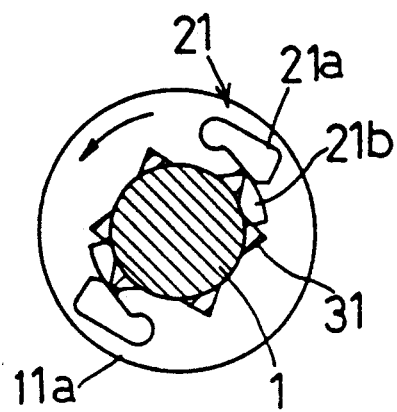
FIG. 12A(H1)
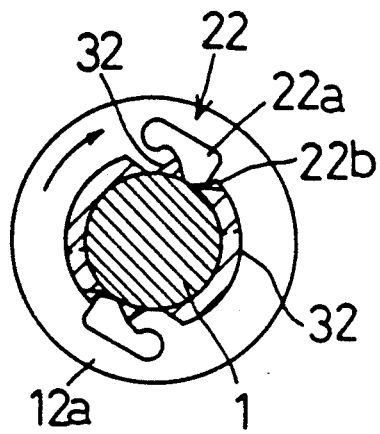
FIG. 12B(H1)
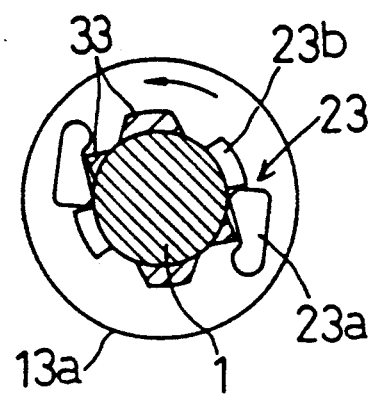
FIG. 12C(H1)
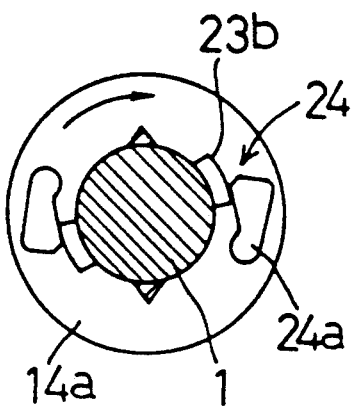
FIG. 12D(H1)

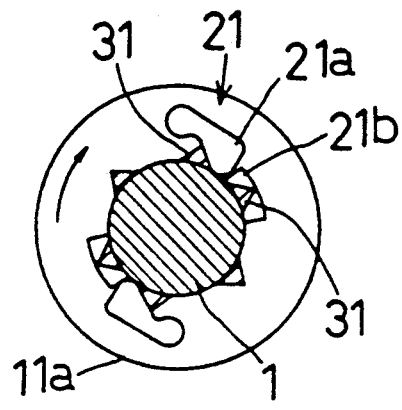
FIG. 14A(L1)
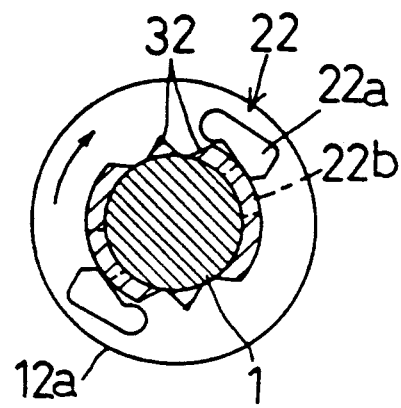
FIG. 14B(L1)
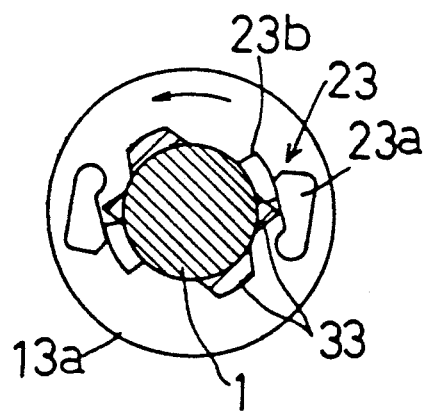
FIG. 14C(L1)
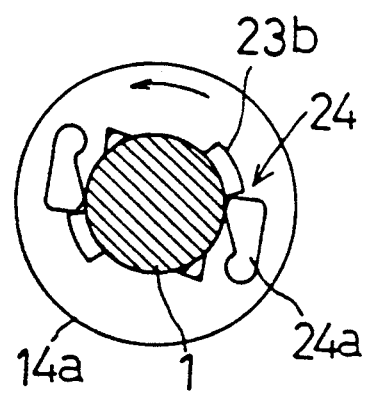
FIG. 14D(L1)

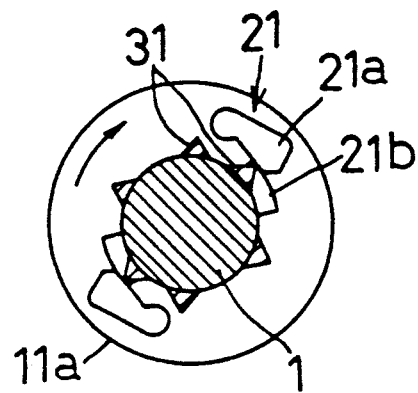
FIG. 15A(L2)
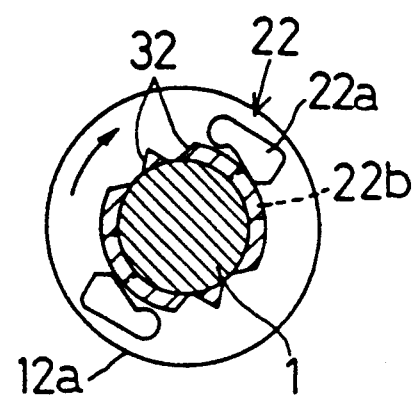
FIG. 15B(L2)
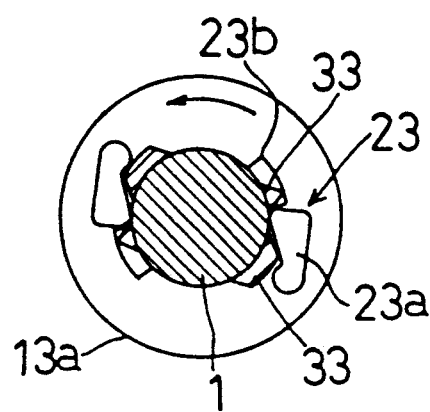
FIG. 15C(L2)
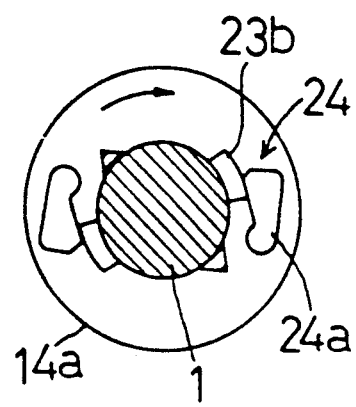
FIG. 15D(L2)

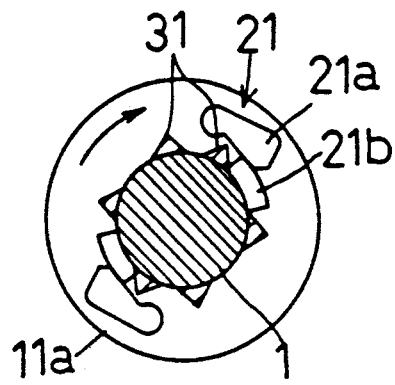
FIG. 16A(L3)
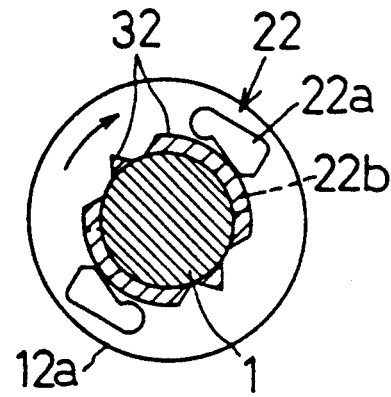
FIG. 16B(L3)
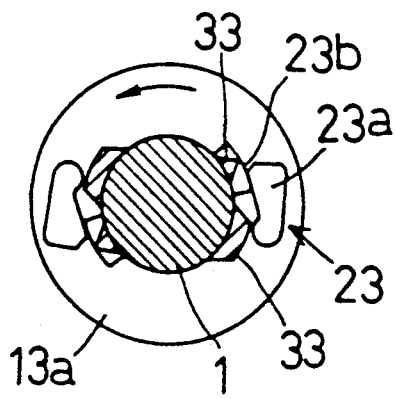
FIG. 16C(L3)
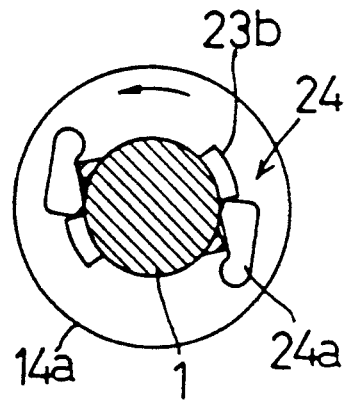
FIG. 16D(L3)

SELF-CONTAINED CHANGE SPEED APPARATUS FOR USE ON A BICYCLE AND HAVING A PLANETARY GEAR MECHANISM

BACKGROUND OF THE INVENTION

1. Field of the Invention

The present invention relates to a self-contained change speed apparatus particularly for use on a bicycle, having a drive member and a hub body rotatably supported on a fixed shaft, and a planetary gear mechanism mounted in a drive transmission path extending from the drive member to the hub body, the planetary gear mechanism including planet gears meshed with sun gears controllable to rotate on and to be locked to the fixed shaft by a control member shiftable on the fixed shaft.

2. Description of the Related Art

A self-contained change speed apparatus as noted above is known from European Patent Publication EP 0 383 350 A2, for example. This apparatus has a single planetary gear mechanism including a plurality of planet gears and a plurality of sun gears. The planet gears are supported by a gear carrier, and meshed with a ring gear. An input selector clutch selects the gear carrier or the ring gear as an input element for receiving drive from the drive member. An output selector clutch selects the gear carrier or the ring gear as an output element for supplying the drive to the hub body.

The sun gears are controllable by the control member through externally operable one-way clutches disposed between the sun gears and fixed shaft. Controls of the sun gears are complicated since, depending on the input element selected by the input selector clutch, forces are applied in different directions for stopping rotation of the sun gears. As a result, the control member and adjacent components have complicated constructions. Specifically, as shown in FIG. 24a, when a force F1 is inputted to the gear carrier supporting planet gears 120b, with the ring gear 150 acting as an output element subjected to a load F2, a reaction F3 is produced against a moment M1 resulting from F1 and F2. Therefore, clockwise rotation (in FIG. 24a) of the sun gear 120a must be stopped. On the other hand, as shown in FIG. 24b, when the force F1 is inputted to the ring gear 160, with the gear carrier acting as the output element subjected to the load F2, a reaction F3 is produced against a moment M3 resulting from F1 and F2. In this case, counterclockwise rotation (in FIG. 24b) of the sun gear 120a must be stopped. Thus, a construction is needed to stop opposite rotations of the sun gear relative to the fixed shaft. For this purpose, the above prior apparatus includes two one-way clutches having different directions of transmission, and means for breaking one-way drive transmission, more precisely variable speed drive transmission through the planetary gear mechanism with the sun gears maintained stationary. This results in a complicated construction. This problem is particularly serious where a multi-planetary gear mechanism is employed in which a plurality of planetary gear mechanism are interconnected in order to provide multiple speed stages. Where a plurality of such planetary gear mechanisms are simply interconnected, a plurality of output selector clutches are required for selecting the output element for supplying drive to the hub body. Controls of these clutches are complicated and require a large overall construction of the apparatus.

SUMMARY OF THE INVENTION

The object of the present invention is to improve the conventional self-contained change speed apparatus and provide an apparatus for facilitating controls of the sun gears and output selector clutch. The invention also intends to provide a compact construction of the self-contained change speed apparatus having a multi-planetary gear mechanism.

The above object is fulfilled, according to the present invention, by a self-contained change speed apparatus as noted in the outset hereof, in which:

the planetary gear mechanism is an accelerating type mechanism with the gear carrier acting as an input element, a plurality of sun gears are provided, sun gear clutch means correspond to the sun gears, respectively, each of the sun gear clutch means including a one-way clutch and breaker means for breaking drive transmission through the one-way clutch, a first output one-way clutch is disposed between the hub body and the gear carrier of the planetary gear mechanism, and a second output one-way clutch is disposed between the hub body and the ring gear of the planetary gear mechanism.

According to this construction, it is adequate to prevent rotation of the sun gears only in one direction relative to the fixed shaft. It is therefore unnecessary to provide one-way clutches for opposite directions as in the conventional apparatus. The construction for controlling the sun gears is now simplified since one-way clutches effective in one direction and means for breaking the one-way transmission, such as a rotatable control member, are sufficient.

The planetary gear mechanism is the accelerating type with the gear carrier acting as an input element. Consequently, the output selector clutch may comprise a first output one-way clutch disposed between the hub body and the gear carrier of the planetary gear mechanism, and a second output one-way clutch disposed between the hub body and the ring gear of the planetary gear mechanism. These one-way clutches do not require external controls. This happens because when the speed is changed using the planetary gears by fixing the sun gears on the fixed shaft, the angular speed of the ring gear is greater than one of the gear carrier so that the power to the hub body is transmitted through the second output one-way clutch.

Where the apparatus according to the present invention employs a multi-planetary gear mechanism, the second planetary gear mechanism may be formed as a decelerating type sharing the gear carrier with the first planetary gear mechanism. This construction not only allows ratios between adjacent speed stages to be determined with a high degree of freedom, but allows the output selector clutch to be formed of two simple one-way clutches requiring no external controls.

In an embodiment of the present invention having two planetary gear mechanisms:

the first and second planetary gear mechanisms are accelerating type mechanism, the first planetary gear mechanism having a plurality of sun gears, the sun gear clutch means being arranged between the sun gears and the fixed shaft, respectively, each of the sun gear clutch means including a one-way clutch and breaker means for breaking drive transmission through the one-way clutch, a first output one-way clutch is disposed between the hub body and the gear carrier of the second planetary gear mechanism, and a second output one-way clutch is disposed between the hub body and the ring gear of the second planetary gear mechanism.

In the apparatus having the above construction also, only one direction may be considered in preventing rotation of the sun gears relative to the fixed shaft. The output selector clutch may be formed of two simple one-way clutches requiring no external controls.

Other features and advantages of the present invention will be apparent from the following description of the preferred embodiments to be had with reference to the drawings.

BRIEF DESCRIPTION OF THE DRAWINGS

FIGS. 1 through 18 show a self-contained change speed apparatus in a first embodiment of the present invention, in which:

FIG. 1 is a sectional view of the change speed apparatus.

FIG. 2 is a sectional view taken on a plane perpendicular to a fixed shaft and showing a relationship between a brake clutch and fourth transmission pawls, FIG. 3 is a sectional view taken on a plane perpendicular to the fixed shaft and showing a relationship between a fourth transmission pawl and a pawl cage, FIG. 4 is a side view, partly broken away, of sleeves, FIG. 5 is a side view of a cam, FIG. 6 is a front view of the cam, FIG. 7 is a perspective view of a ball pushing element, FIG. 8 is a perspective view of a wire catch, FIG. 9 is a perspective view of a rotation restrictor, FIG. 10 is a sectional view taken on a plane perpendicular to the fixed shaft and showing third high-speed positions of sun clutches, FIG. 11 is a sectional view taken on the plane perpendicular to the fixed shaft and showing second high-speed positions of the sun clutches, FIG. 12 is a sectional view taken on the plane perpendicular to the fixed shaft and showing first high-speed positions of the sun clutches, FIG. 13 is a sectional view taken on the plane perpendicular to the fixed shaft and showing intermediate speed positions of the sun clutches, FIG. 14 is a sectional view taken on the plane perpendicular to the fixed shaft and showing first low-speed positions of the sun clutches, FIG. 15 is a sectional view taken on the plane perpendicular to the fixed shaft and showing second low-speed positions of the sun clutches, FIG. 16 is a sectional view taken on the plane perpendicular to the fixed shaft and showing third low-speed positions of the sun clutches, FIG. 17 is a diagram corresponding to FIG. 1, and FIG. 18 is a view illustrating speed ratios.

DETAILED DESCRIPTION OF THE PREFERRED EMBODIMENTS

A first embodiment of the present invention will be described with reference to FIGS. 1 through 18.

Figure 1:
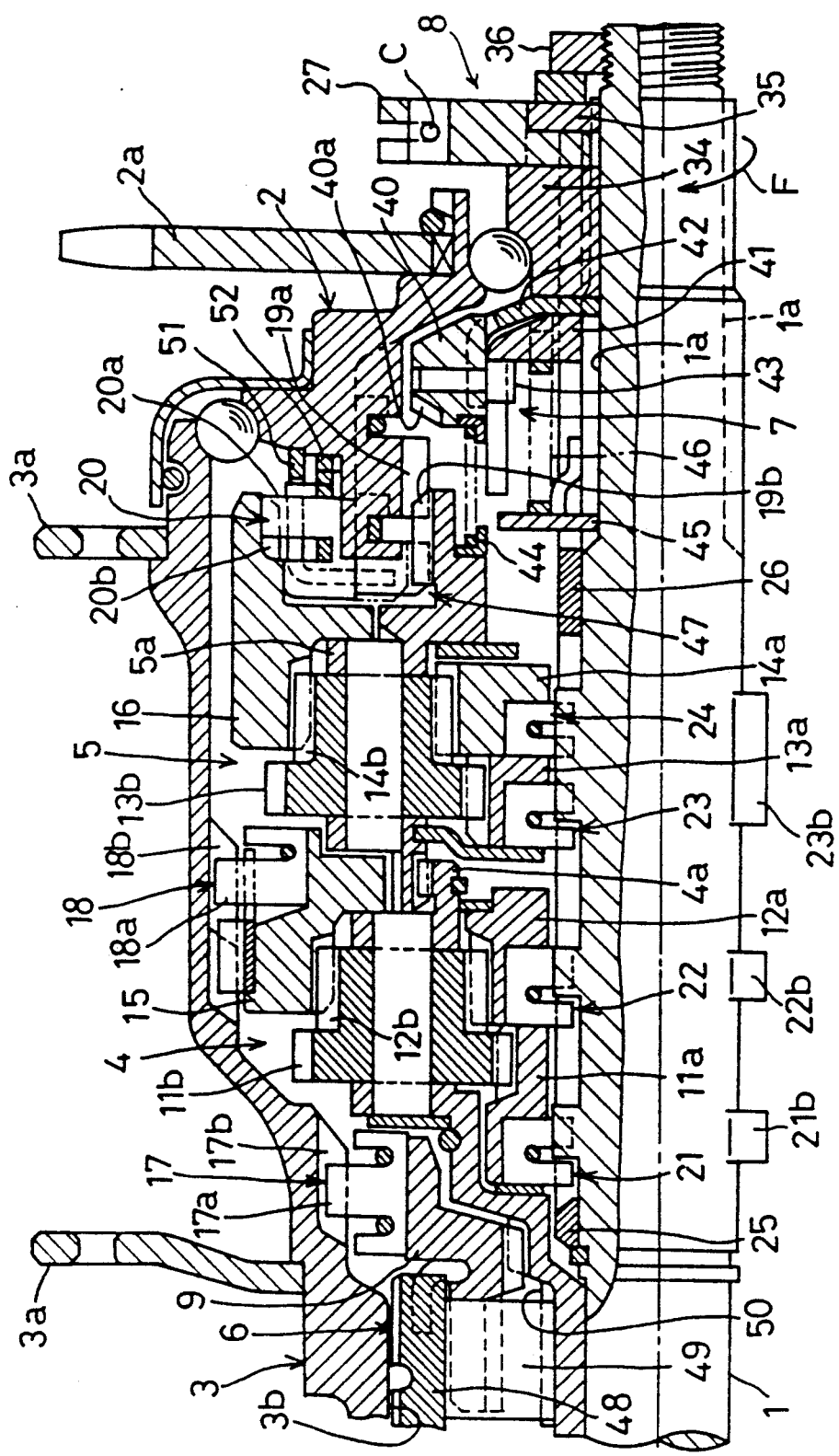

As shown in FIG. 1, a self-contained change speed apparatus according to the present invention, broadly, comprises a fixed shaft 1 secured to a bicycle frame, a drive member 2 and a hub body 3 rotatably supported on the fixed shaft 1, and a drive transmission mechanism for transmitting torque from the drive member 2 to the hub body 3. The drive transmission mechanism includes an accelerating type first planetary gear mechanism 4, and a decelerating type second planetary gear mechanism 5 disposed between the first planetary gear mechanism 4 and drive member 2. A coaster brake 6 is provided on a side remote from the drive member 22, i.e. at a lefthand end in FIG. 1. The drive member 2 has a chainwheel 2a, and the hub body 3 has a hub 3a for supporting spokes. As will be described later, the drive transmission mechanism includes a clutch operating mechanism 7 for switching drive transmitting lines. A control member 8 is rotatably mounted on the fixed shaft 1 for controlling the clutch operating mechanism 7 and sun gear clutches arranged between sun gears of the two planetary gear mechanism and the fixed shaft 1. This embodiment provides seven speed stages as described later.

The first planetary gear mechanism 4 includes a first gear carrier 4a relatively unrotatably engaged with a relay member 9 provided in a region of the coaster brake 6. The first planetary gear mechanism 4 further includes a first and a second sun gears 11a and 12a supported on the fixed shaft 1 to be rotatable independently of each other and axially immovable. The first and second sun gears 11a and 12a, respectively, are meshed with first and second planet gears 11b and 12b, and supported by the first gear carrier 4a, each pair of first and second planet gears being formed integral. The second planet gears 12b are meshed also with a first ring gear 15. The second planetary gear mechanism 5 includes a second gear carrier 5a splined to the first gear carrier 4a to be unrotatable relative to each other. The second planetary gear mechanism 5 further includes a third and a fourth sun gears 13a and 14a supported on the fixed shaft 1 to be rotatable independently of each other and axially immovable. The third and fourth sun gears 13a and 14a respectively are meshed with third and fourth planet gears 13b and 14b formed integral and supported by the second gear carrier 5a. The fourth planet gears 14b are mexhed also with a second ring gear 16.

Selective free wheeling and locking controls of the sun gears 11a, 12a, and 13a and 14a relative to the fixed shaft 1 are carried out by the control member 8 as described in detail later.

The first ring gear 15 and relay member 9 are selectively used as an output element of the double planetary gear mechanism to act on the hub body 3. The second ring gear 16 and second gear carrier 5a are selectively used as an input element to receive drive from the drive member 2. One-way clutches are employed to effect selective drive transmission between these components. Specifically, output one-way clutches include a first transmission clutch 17 provided between the relay member 9 and hub body 3, and a second transmission clutch 18 provided between the first ring gear 15 and hub body 3. Input one-way clutches include a third transmission clutch 19 provided between the second gear carrier 5a and drive member 2, and a fourth transmission clutch 20 provided between the second ring gear 16 and drive member 2. These one-way clutches include first to fourth transmission ratchet pawls 17a, 18a, 19a and 20a, and first to fourth transmission ratchet teeth 17b, 18b, 19b and 20b, respectively. The transmission pawls 17a, 18a, 19a and 20a are constantly spring-loaded for engagement with the corresponding ratchet teeth 17b, 18b, 19b and 20b. The first transmission pawls 17a are attached to the relay member 9, the second transmission pawls 18a to the first ring gear 15, and the third and fourth transmission pawls 18a and 19a to the drive member 2. The transmission pawls 17a, 18a, 19a and 20 a are oriented such that the hub body 3, second gear carrier 5a or second ring gear 16 is driven only when the components carrying the pawls are rotated in the direction of arrow F in FIG. 1. The third transmission pawls 19a are meshed with the third transmission teeth 19b over an entire width thereof, and the third transmission clutch 19 is operable by the clutch operating mechanism 7 described later.

As shown in FIGS. 1 and 10 through 16, a first to a fourth sun clutch 21, 22, 23 and 24 formed as one-way clutches are arranged between the fixed shaft 1 and the first to fourth sun gears 11a, 12a, 13a and 14a. These sun clutches 21, 22, 23 and 24 include first to fourth sun pawls 21a, 22a, 23a and 24a pivotably attached to inner peripheral walls of the first to fourth sun gears 11a, 12a, 13a and 14a and constantly urged toward the fixed shaft 1, respectively. The fixed shaft 1 defines first restrictor projections 21b enageable with the first sun pawls 21a, second restrictor projections 22b engageable with the second sun pawls 22a, and third restrictor projections 23b engageable with both the third and fourth sun pawls 23a and 24a. These sun pawls and restrictor projections are cooperable to prevent the respective sun gears from rotating in one direction around the fixed shaft 1. The first and second sun clutches 21 and 22 allow rotation opposite of the driving direction F relative to the fixed shaft 1. The third and fourth sun clutches 23 and 24 allow rotation in the driving direction F relative to the fixd shaft 1. The first sun gear 11a has a small diameter, and includes a boss extending leftward for forming the first sun clutch 21.

The planetary gear mechanisms are operable to transmit the drive in varied speeds, with the rotation of the sun gears prohibited by the sun clutches, i.e. with the gun gears locked. The transmission in varied speeds with the gun gears locked against rotation is selectively achieved by action of the control member 8.

Figure 4:
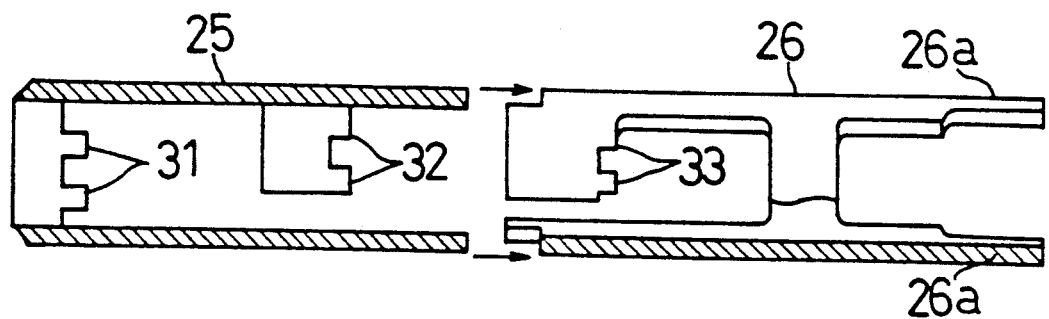
Figure 8:
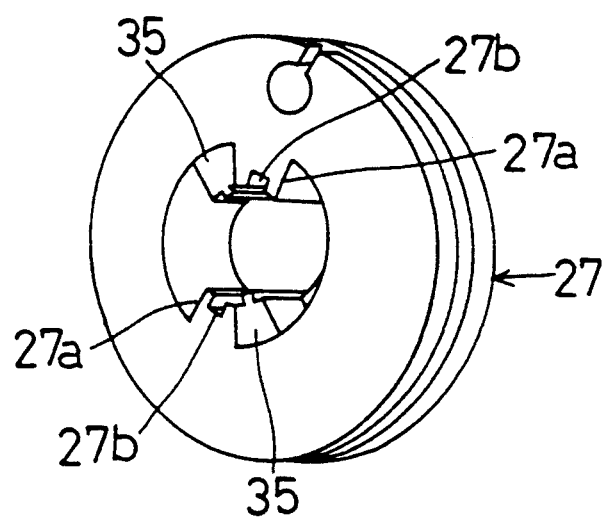
Figure 9:
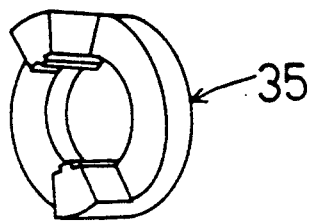
Figure 13A:
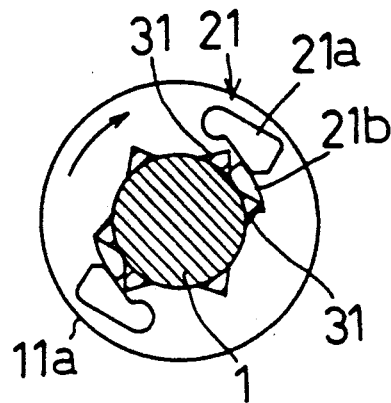
Figure 13B:
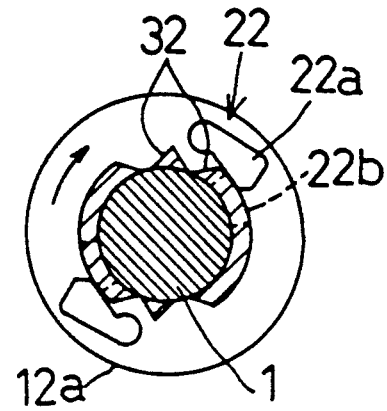
Figure 13C:
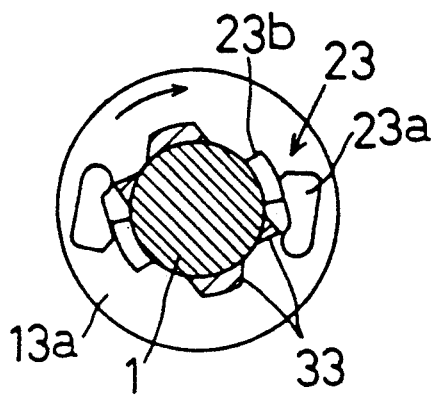
Figure 13D:
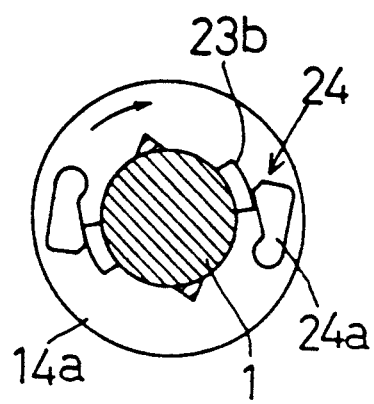

As shown in FIGS. 1, 4 and 8, the control member 8 includes a first sleeve 25 and a second sleeve 26 rotatably mounted on the fixed shaft 1 and arranged in order from a position adjacent the coaster brake 6, and a wire catch 27 for engaging a nipple of a control wire C. The first sleeve 25 defines a first fork extending axially, i.e. rightward in FIG. 4. The seonc sleeve 26 defines a second and a third forks extending axially and outwardly from opposite ends thereof. The two sleeves 25 and 26 are interconnected to be unrotatable relative to each other. Extreme ends 26a of the third fork are engageable with grooves 27b formed on projections 27a extending toward the center from inner peripheral walls of the wire catch 27 having a ring-like shape as shown in FIG. 8. The control member 8 as a whole is rotatable relative to the fixed shaft 1.

The free wheeling and locking controls of the sun gears 11a, 12a, 13a and 14a relative to the fixed shaft 1 are carried out by rotating the control member 8 and thus the first and second sleeves 25 and 26. As shown in FIG. 4, the first sleeve 25 includes tongues extending axially from a tubular forward end thereof to act as a first control section 31, and tongues extending axially from a radially extending intermediate portion of the first sleeve 25 to act as a second control section 32. The second sleeve 26 includes tongues extending axially from a tube segment at a forward end thereof to act as a third control section 33. As shown in FIGS. 10 through 16, these control sections may be combined with the corresponding first to third restrictor projections 21b, 22b and 23b to prevent engagement between the restrictor projections 21b, 22b and 23b and the first to third sun pawls 21a, 22a and 23a, thereby allowing free wheeling of the sun gears 11a, 12a and 13a. For this purpose, as seen from FIGS. 10 through 16, the control sections define inclined surfaces to cause the sun pawls moving around the fixed shaft 1 to mount the restrictor projections. In this embodiment, the fourth sun clutch 24 requires no control.

As shown in FIGS. 1 and 7 through 9, the wire catch 27 is mounted between a ball pushing element 34 formed as an inner race of a bearing and a rotation restrictor 35 for contacting the projections 27a to limit angles of rotation of the control member 8 within a predetermined range. The ball pushing element 34 and rotation restrictor 35 are engaged with a fixing groove 1a defined on the fixed shaft 1 not to be rotatable relative thereto. Numeral 36 in FIG. 1 denotes a retainer nut for maintaining the various components in place. Balls are mounted between the ball pushing element 34 and drive member 2 and between the drive member 2 and hub body 3 to allow relative rotation.

Figure 5:
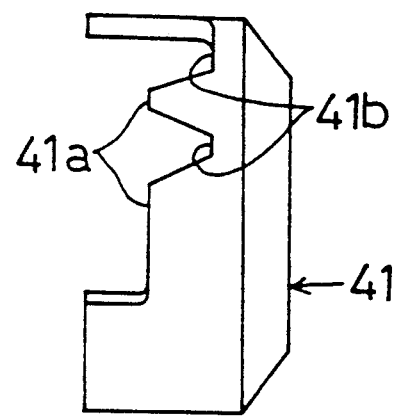
Figure 6:
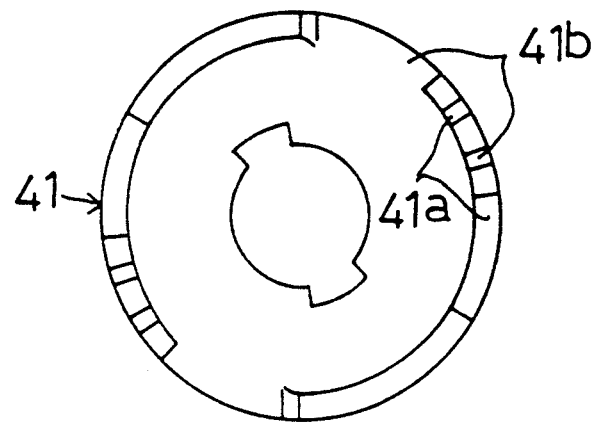
Figure 7:
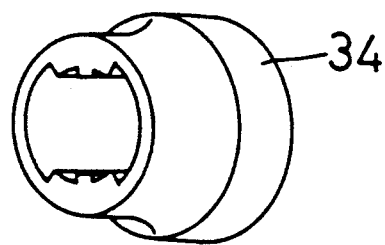

As shown in FIGS. 1, 5 and 6, the clutch operating mechanism 7 for raising the transmission pawls of the third transmission clutch 19 formed as a one-way clutch to break transmission therethrough, includes a clutch operator 40 for acting on the third transmission clutch 19, a fixed plate 42 in the form of a perforated cap for axially movably supporting the clutch operator 40, and an annular cam 41 rotatably fitted in an inside space of the fixed plate 42. The cam 41 has a central bore defining grooves for unrotatably receiving the third fork formed on the second sleeve 26 of the control member 8. Part of the fixed plate 42 is engaged with the fixing groove 1a not to be rotatable relative to the fixed shaft 1. The clutch operator 40 has inner peripheries thereof fitted to the fixed plate 42, whereby the clutch operator 40 is not rotatable relative to the fixed shaft 1. The cam 41 includes a cylindrical portion extending axially from outer peripheries thereof and notched to produce a radial cam profile. Consequently, as shown in FIG. 5, the cam 41 defines clutch releasing sections 41a and clutch engaging sections 41b having different axial length. The cam 41 is contactable through the fixed plate 42 by the ball pushing element 34 to be limited in movement rightward in FIG. 1. The clutch operator 40 has pins 43 press fitted radially thereof. When heads of the pins 43 acting as cam followers are pushed, the clutch operator 40 moves leftward. The clutch operator 40 includes a contact portions 40a formed on the left side of the cam followers. When the clutch operator 40 is moved, the contact portions 40a contact the third transmission pawls 19a and raise these pawls to outer peripheries of the clutch operator 40. The cam 41 is urged to return rightward by a compression spring 44 mounted between the cam 41 and second gear carrier 5a. Further, a torsion spring 46 is mounted between the cam 41 and a spring stopper plate 45 engaged with the fixing groove 1a not to be rotatable relative to the fixed shaft 1. The torsion spring 46 urges the cam 41 and the control member 8 engaged with the cam 41 to return in the direction opposite to the driving direction F.

The coaster frame 6 is operable when the drive member 2 rotates backward to rotate the gear carriers 4a and 5a backward through a one-way brake clutch 47 provided between the drive member 2 and second gear carrier 5a. The coaster brake 6 is itself known, and includes brake shoes 48 arranged annularly and opposed to a braking inside surface 3b of the hub body 3, a plurality of rollers 49 arranged on inside surfaces of the brake shoes 48, and cam surfaces formed on the first gear carrier 4a for radially outwardly pushing the rollers 49 when the first gear carrier 4a rotates backward.

Figure 2:
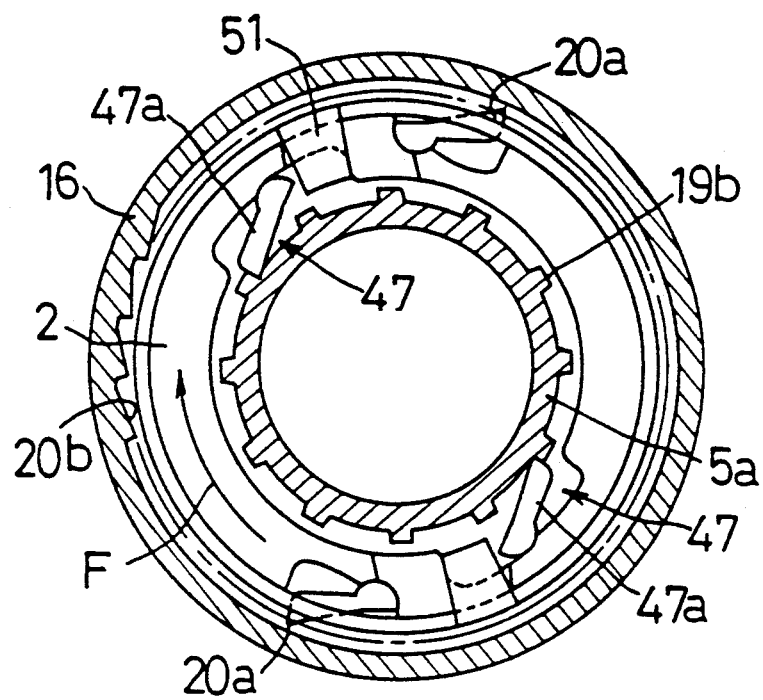
Figure 3:
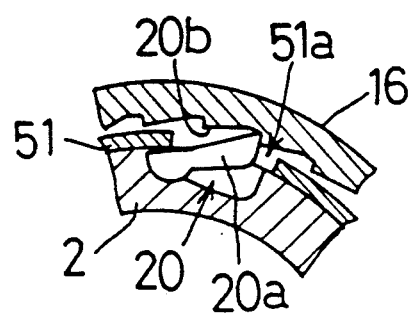

As shown in FIGS. 1 through 3, the brake clutch 47 includes braking ratchet pawls 47a and third transmission teeth 19b. The braking pawls 47a are constantly spring-loaded toward the third transmission teeth 19b, and oriented in an opposite direction to the third transmission clutch 19. The fourth transmission pawls 20a project toward the fourth transmission teeth 20b through cutouts 51a formed in an annular pawl cag 51. The pawl cage 51 includes projecting pieces extending radially from a side surface thereof to positions adjacent proximal ends of the braking pawls 47a. The proximal ends of the braking pawls 47a are movable relative to the drive member 2 when the braking pawls 47a are engaged with the third transmission teeth 19b. The movement of these proximal ends moves the cage 51 and the cutouts 51a relative to the drive member 2 through the projecting pieces, thereby to turn down the fourth transmission pawls 20a. This breaks the transmission between the fourth transmission clutch 20 and second ring gear 16. Consequently, the coaster brake 6 is operable through the brake clutch 47 and gear carriers 4a and 5a when the drive member 2 rotates backward, without being locked by the fourth transmission clutch 20 and brake clutch 47. Numeral 52 in FIG. 1 denotes a torsion spring for urging the pawl cage 51 back to a position to place the fourth transmission clutch 20 in an operable position.

Figure 17:
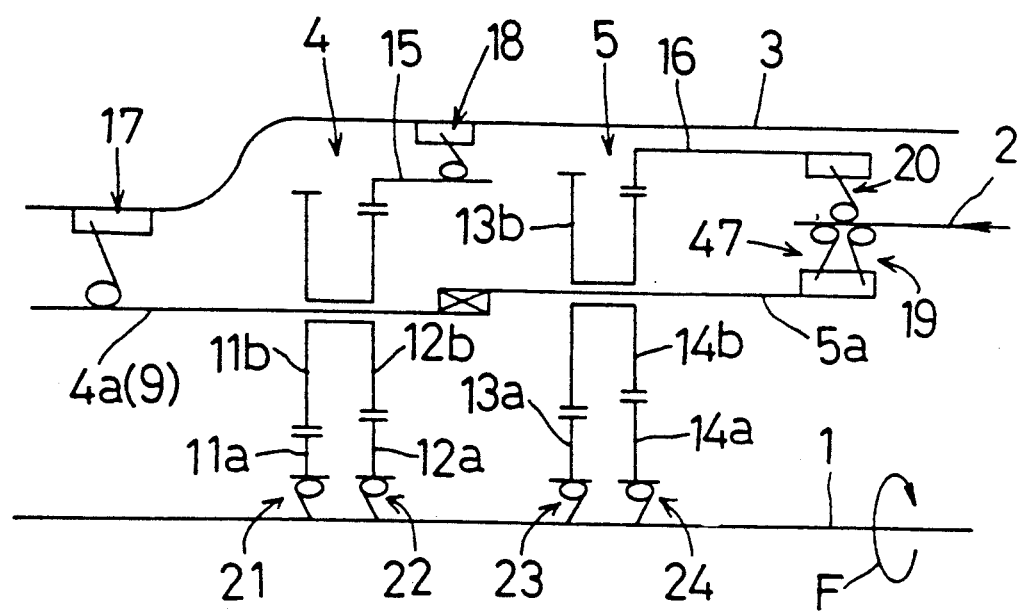

Reference is now made to Table 1 and the drawings for describing switching of the drive transmission system, the controls of the sun gears 11a, 12a, 13a and 14a, and switching of the first to seventh speeds resulting from the sun gear controls. In Table 1, the sign "—" signifies states in which the one-way clutches 17-24 are inoperative and relative rotation thereof is allowed, which are hereinafter referred to as "inoperative" states. The sign "O" signifies states in which the relative rotation of the one-way clutches is prohibited, which are hereinafter referred to as "engaged" states. The sign "X" signifies states in which engagement of the one-way clutches is prevented by external controls to allow the relative rotation thereof, which are hereinafter referred to as "disengaged" states. The clutches without the "X" sign require no external controls. To facilitate understanding. FIG. 17 shows a diagram which is a schematic view of the first embodiment shown in FIG. 1.

TABLE 1

| speeds | clutch controls | | | | | | | |
|---|---|---|---|---|---|---|---|---|
| | 21 | 22 | 23 | 24 | 19 | 17 | 18 | 20 |
| H3 | — | O | — | — | O | — | O | — |
| H2 | O | X | — | — | O | — | O | — |
| H1 | — | O | O | — | X | — | O | O |
| M | X | X | — | — | O | O | — | — |
| L1 | O | X | X | O | X | — | O | O |
| L2 | X | X | O | — | X | O | — | O |
| L3 | X | X | X | O | X | O | — | O |

Functions of the first planetary gear mechanism 4 will be described first. Since the first planetary gear mechanism 4 is the accelerating type, the first ring gear 15 has a greater angular velocity than the relay member 9 whenever one of the first and second sun clutches 21 and 22 is engaged. Consequently, the second transmission clutch 18 is engaged, i.e. in the transmission state, while the first transmission clutch 17 is in the inoperative state or free rotation state. The drive transmission line then becomes an accelerating line extending from the first ring gear 15 through the second transmission clutch 18 to the hub body 3. On the other hand, when both the first and second sun clutches 21 and 22 are disengaged, the second transmission clutch 18 becomes inoperative or freely rotatable. Then the drive transmission line forms a direct line extending from the relay member 9 through the first transmission clutch 17 to the hub body 3. Thus, in the first planetary gear mechanism 4, the drive transmission line is switchable only by controlling the first and second sun clutches 21 and 22. The first and second transmission clutches 17 and 18 require no external controls as seen from the absence of sign "X" from the columns of these clutches in Table 1.

In the second planetary gear mechanism 5 which is the decelerating type in this embodiment, when the third transmission clutch 19 is engaged, a direct drive transmission line if formed to extend from the drive member 2 through the third transmission clutch 19 to the gear carrier 5a. On the other hand, when the third transmission clutch 19 is disengaged by the action of the clutch operating mechanism 7, the drive transmission line becomes a decelerating line extending from the drive member 2 through the fourth transmission clutch 20 and second ring gear 16 to the gear carrier 5a. Thus, in the second planetary gear mechanism 5, the drive transmission line is switchable only by controlling the clutch operating mechanism 7.

Figure 19:
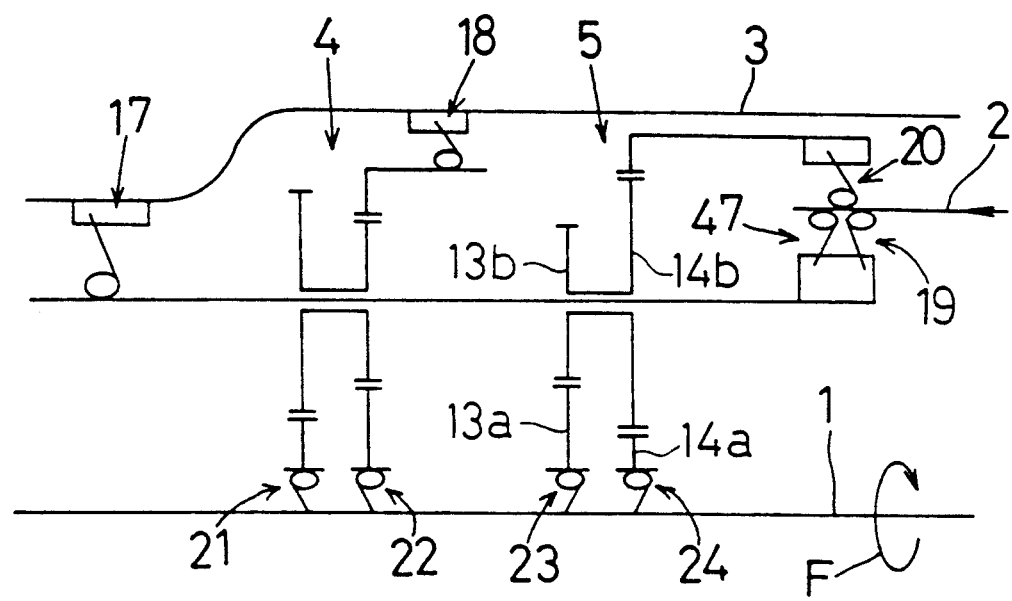
FIG. 19 is a diagram of a second embodiment.

In the first embodiment of the present invention having the first and second planetary gear mechanisms, change speed is effected by displacing the control wire to rotate the control member 8 in steps of 15 degrees in the driving direction F. This operation controls the first to third control sections and clutch operating mechanism 7, which in turn control the sun clutches 21-23 and third transmission pawls 19a. With the changes of the drive transmission lines, seven speeds are successively provided, as shown in FIG. 19, from the fastest, third high speed to the slowest, third low speed. More particularly, from a standard state in which the control wire is in neutral position corresponding to a speed M with the input and output directly interconnected, accelerated speeds are provided by relaxing the control wire to return the control member 8 under the urging force of the torsion spring in the direction opposite to the driving direction F, and decelerated speeds by pulling the control wire to rotate the control member 8 in the driving direction F. FIGS. 10 through 16 show positions of the first to fourth sun clutches 21-24 corresponding to the respective stages from the fastest, third high speed to the slowest, third low speed.

Figure 18:
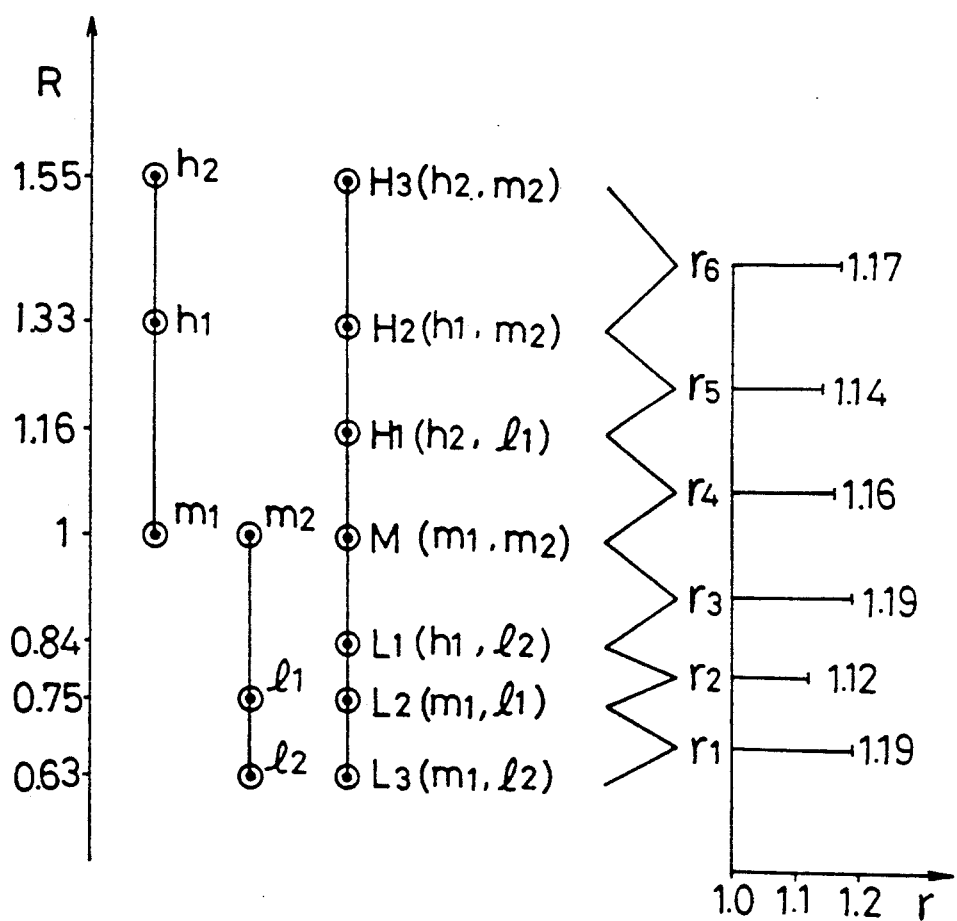

To describe the terms used in FIG. 18, speed ratio R is the number of rotation of the output element divided by the number of rotation of the input element. Thus, speed ratio R=1 corresponds to the state without acceleration and deceleration. H1-H3 denote the high speed stages of the entire apparatus. L1-L3 the low speed stages, and M the state of the apparatus not effecting acceleration or deceleration. The "interstage speed ratio r" is the speed ratio of the higher of two adjacent speeds divided by that of the lower. For example, the interstage speed ratio r5 is about 1.14 which is derived from 1.33 divided by 1.16. The valves of R and r in FIG. 18 are results shown only to the second decimal place of calculations based on high-order decimals. Therefore, slight errors exist between the valves derived from the illustrated speed ratios R as they are, and the illustrated interstage speed ratios r.

It will be understood from FIG. 18 that the interstage speed ratios r may be determined with a high degree of freedom by setting the speed ratios R of the planetary gear mechanisms 4 and 5 independently of each other and by combining these speed ratios. According to the construction described above, change speed operations are carried out only by rotating the single control member 8, and the sun clutches may only be limited to rotation in one direction. Further, the axially movable components are only those related to the clutch operating mechanism 7. Thus, the entire apparatus has a very simple construction and does not easily fail.

Other embodiments of the present invention will be described hereinafter. These embodiments are illustrated only in diagrams similar to FIG. 17 schematically showing the first embodiment. This is because the various components in these embodiments are substantially the same as or similar to those in the first embodiment, the repetition is believed unnecessary. For simplicity of illustration, the coaster brake is omitted from all the diagrams referred to hereinafter. In the following embodiments, as in the first embodiment, the coaster brake is interlocked to the gear carrier of the first planetary gear mechanism.

Referring to FIG. 19, a second embodiment of the present invention has the same basic construction as the first embodiment. In the second embodiment, the sun gears and planet gears of the second planetary gear mechanism 5 have sizes reversed from what they are in the first embodiment. This is, in this embodiment, the third sun gear 13a is larger than the fourth sun gear 14a, and the third planet gears 13b smaller than the fourth planet gears 14b. Table 2 below shows states of the clutches 21-24 and 19 in the second embodiment, and FIG. 20 shows speed ratio relations.

TABLE 2

| speeds | clutch controls | | | | |
|---|---|---|---|---|---|
| | 21 | 22 | 23 | 24 | 19 |
| H3 | — | O | — | — | O |
| H2 | O | X | — | — | O |
| H1 | — | O | — | O | X |
| M | X | X | — | — | O |
| L1 | — | O | O | X | X |
| L2 | X | X | — | O | X |
| L3 | X | X | O | X | X |

Figure 20:
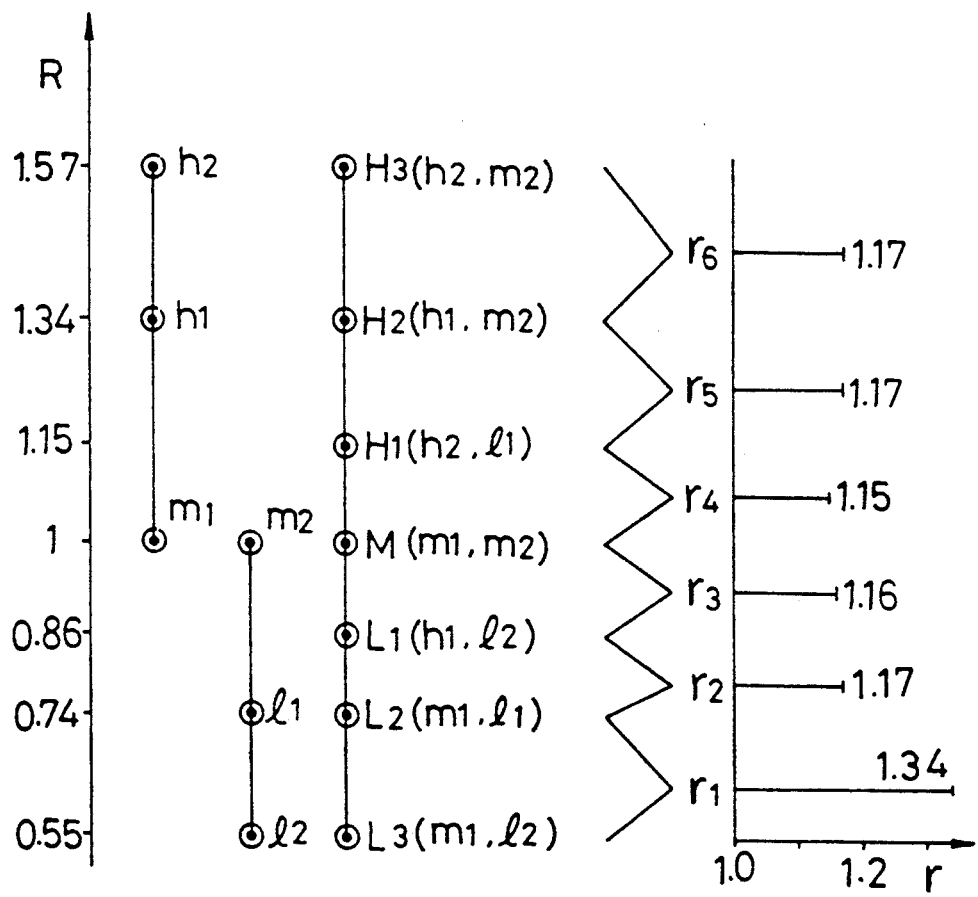
FIG. 20 is a view illustrating speed ratios in the second embodiment.

In this embodiment, as readily understood from FIG. 20, the lowest order interstage speed ratio r1 is greater than the other interstage speed ratios. This arrangement allows delicate adjustment of pedaling loads in the high-speed stages where the pedaling loads are heavier, while allowing light pedaling on steep slopes.

Figure 21:
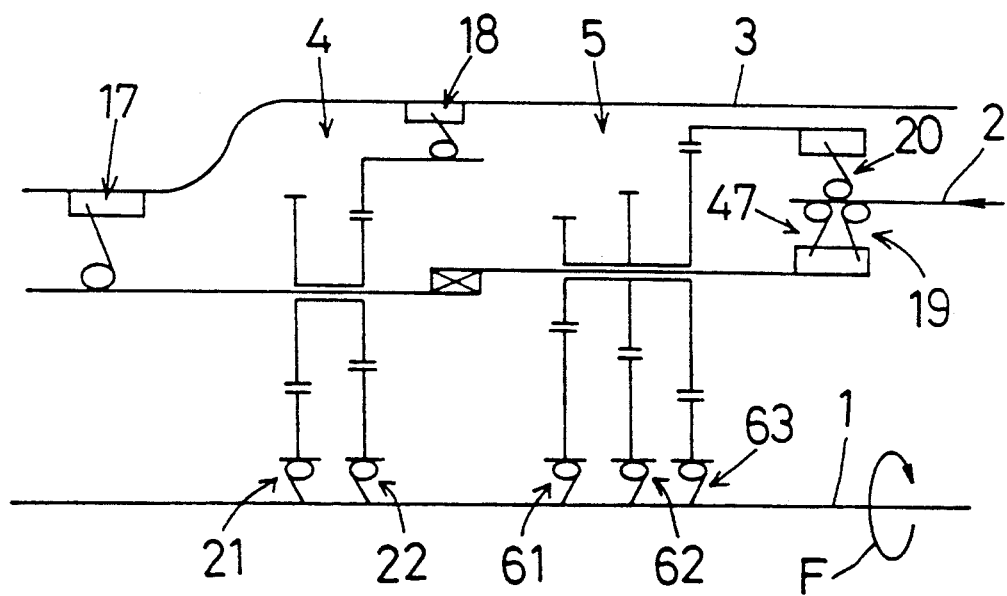
FIG. 21 is a diagram of a third embodiment.
Figure 22:
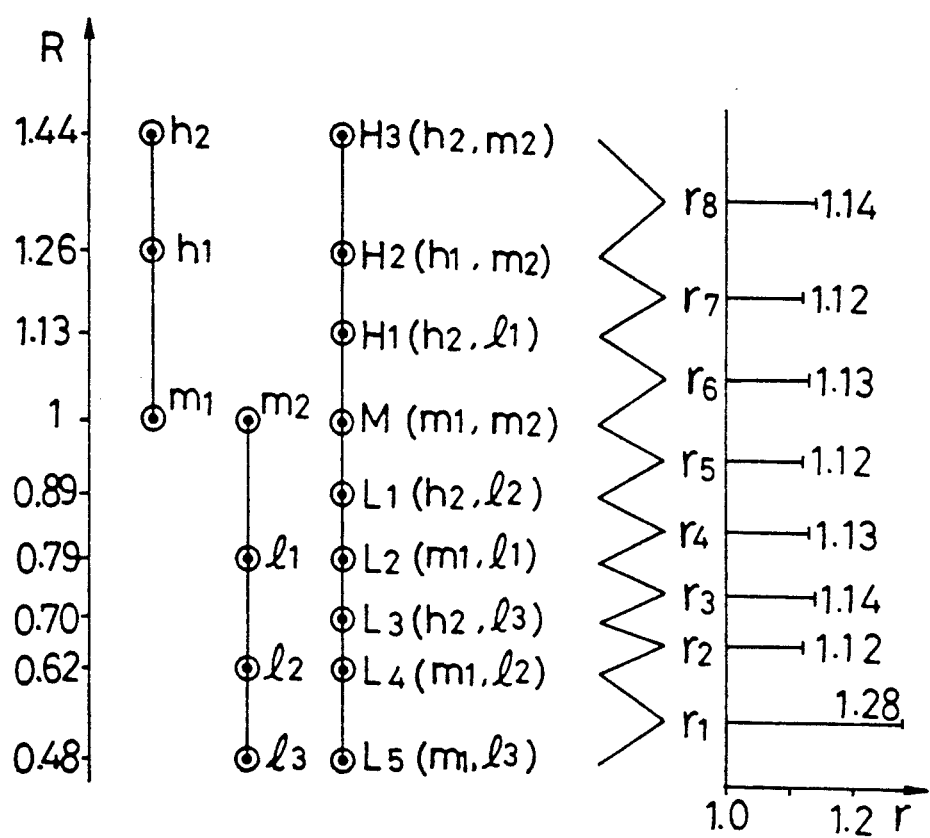
FIG. 22 is a view illustrating speed ratios in the third embodiment.

FIG. 21 shows a self-contained change speed apparatus in a third embodiment of the present invention. This embodiment has the same basic construction as the first embodiment, but the second planetary gear mechanism 5 here includes three sets of sun gears, planet gears, and sun gear clutches for controlling the sun gears. With the increase in the speed stages provided by the second planetary gear mechanism, the entire apparatus now provides a total of nine speeds. Table 3 below shows states of the clutches 21, 22, 61-63 and 19. The first, second, fourth and fifth sun clutches 21, 22, 62 and 63 are externally controllable by the control member 8, while the third sun clutch requires no external control. FIG. 22 shows speed ratio relations in this embodiment.

TABLE 3

| speeds | clutch controls | | | | | |
|---|---|---|---|---|---|---|
| | 21 | 22 | 61 | 62 | 63 | 19 |
| H3 | — | O | — | — | — | O |
| H2 | O | X | — | — | — | O |
| H1 | — | O | — | — | O | X |
| M | X | X | — | — | — | O |
| L1 | — | O | — | O | X | X |
| L2 | X | X | — | — | O | X |
| L3 | — | O | O | X | X | X |
| L4 | X | X | — | O | X | X |
| L5 | X | X | O | X | X | X |

Figure 23:
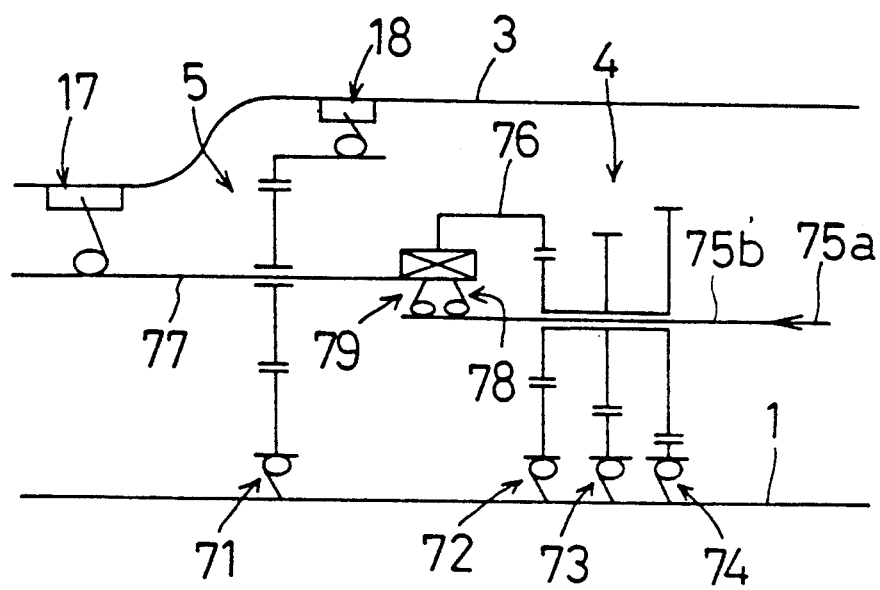
FIG. 23 is a diagram of a fourth embodiment.
Figure 24A:
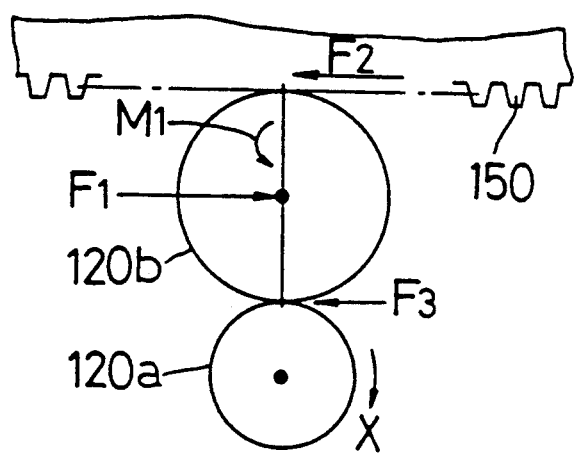
FIGS. 24a and 24b are views illustrating sun gear controls in the prior art.
Figure 24B:
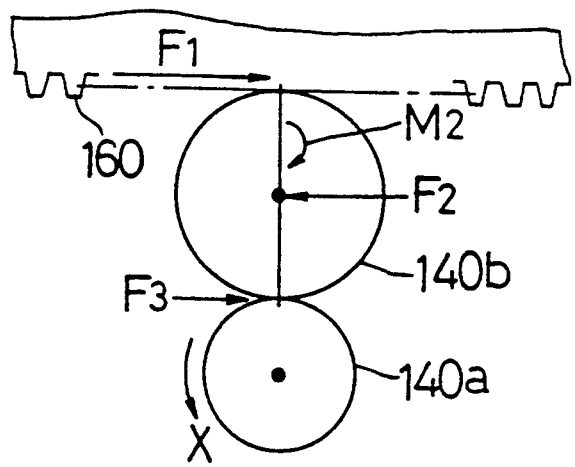

FIG. 23 shows a self-contained change speed apparatus in a fourth embodiment of the present invention. This embodiment differs from the preceding embodiments in that the first and second planetary gear mechanisms 4 and 5 are both the accelerating type, with the first planetary gear mechanism 4 disposed closer than the second planetary gear mechanism 5 to the drive member 2. The second planetary gear mechanism 5 includes one set of sun gear and planet gears, while the first planetary gear mechanism 4 includes three sets of sun gear and planet gears. The drive member 75a is directly coupled to a gear carrier 75b of the first planetary gear mechanism 4, so that the drive member 75a and gear carrier 75b may be formed integral with each. The second planetary gear mechanism 5 has a gear carrier 77 unrotatably coupled to a ring gear 76 of the first planetary gear mechanism 4. A fourth transmission clutch 78 and brake clutch 79 corresponding to the fourth transmission clutch and brake clutch in the preceding embodiments are interposed between the two gear carriers 75b and 77. The brake clutch 79 is constantly disengaged during an ordinary run, and is forcibly engagable when the drive member is rotated backward. Table 4 below shows states of sun clutches 71-74 in this embodiment. The sun clutches 71-74 are externally controllable by the control member 8, while the one-way output clutches 17 and 18 provided for the second gear carrier 77 and second ring gear 70 require no external controls. In this embodiment, all speeds are accelerated speeds except the slowest speed, that is when the input and output are directly interconnected. Therefore, the chainwheel is formed to have a larger diameter than the normal standard.

TABLE 4

| speeds | clutch controls | | | |
|---|---|---|---|---|
| | 71 | 72 | 72 | 74 |
| H6 | O | O | — | — |
| H5 | O | X | O | — |
| H4 | O | X | X | O |
| H3 | X | O | — | — |
| H2 | X | X | O | — |
| H1 | X | X | X | O |
| M | X | X | X | X |

Each of the embodiments described hereinbefore has two planetary gear mechanisms. However, it is within the scope of the present invention to provide an apparatus having a single planetary gear mechanism or three or more planetary gear mechanisms. It is the basic feature of the present invention to enable drive transmission in one direction by means of the one-way clutches arranged between the sun gears and fixed shaft, more particularly to switch the sun gears by external controls from the state of being locked to the fixed shaft to the free rotation state, thereby to select an output line. The constructions of the planetary gear mechanisms are not limitative as long as the above feature is secured.

The first embodiment has been described to have the single control member 8 for controlling the sun clutches and clutch operating mechanism from adjacent the drive member. Instead of this construction, separate control members may be provided to control the sun gears and the clutch operating mechanism, the control members being separately operable from adjacent the drive member and the coaster brake. Further, the components for supporting the clutch pawls and those for supporting the clutch teeth or restrictor projections may be interchanged. For example, the fixed shaft 1 may support the sun pawls 21a–21d of the sun clutches 21–24, with the restrictor projections 21b–23b formed on the inner walls of the sun gears. The control member 8 is not limited to the rotatable type, but may be a control rod extending and movable axially through the fixed shaft 1 to control the clutches, for example.

What is claimed is:

1. A self-contained change speed apparatus comprising:
  a fixed shaft;
  a drive member and a hub body rotatably supported on said fixed shaft;
  a planentary gear mechanism for receiving drive from said drive member, said planetary gear mechanism including:
    a plurality of sun gears arranged on said fixed shaft,
    planet gear means having gears meshed with said sun gears,
    a gear carrier for supporting said planet gear means, and
    a ring gear meshed with said planet gear means,
  said planetary gear mechanism being an accelerated type mechanism with said gear carrier acting as an input element;
  sun gear clutch means arranged between said sun gears and said fixed shaft, respectively, each of said sun gear clutch means including a one-way clutch and breaker means for breaking drive transmission through said one-way clutch;
  control means for controlling said sun gear clutch means; and
  a first output one-way clutch disposed between said hub body and said gear carrier of said planetary gear mechanism, and a second output one-way clutch disposed between said hub body and said ring gear of said planetary gear mechanism;
  wherein an output line extending through one of said first and second one-way clutches is determined by said control means controlling said sun gear clutch means; and
  further comprising a second planetary gear mechanism disposed between said drive member and said planetary gear mechansim and including:
    at least one sun gear mounted on said fixed shaft;
    planet gears meshed with said sun gear;
    a gear carrier for supporting said planet gears;
    a ring gear meshed with said planet gears; and
  sun gear clutch means disposed between said sun gear and said fixed shaft to be controllable by said control means.

2. A self-contained change speed apparatus as claimed in claim 1, wherein said gear carrier of said second planetary gear mechanism is connected to said gear carrier of said planetary gear mechanism.

3. A self-contained change speed apparatus as claimed in claim 2, further comprising input selecting means controllable by said control means to selectively switch between drive transmission from said drive member to said ring gear of said second planetary gear mechanism, and drive transmission from said drive member to said gear carrier of said second planetary gear mechanism.

4. A self-contained change speed apparatus as claimed in claim 2, wherein said second planetary gear mechanism is a decelerating type including a plurality of sun gears, said sun gear clutch means corresponding to said sun gears and each including a one-way clutch and breaker means for breaking drive transmission through said one-way clutch.

5. A self-contained change speed apparatus as claimed in claim 1, further comprising input selecting means controllable, by said control means to selectively switch between drive transmission from said drive member to said ring gear of said second planetary gear mechanism, and drive transmisson from said drive member to said gear carrier of said second planetary gear mechanism.

6. A self-contained change speed apparatus as claimed in claim 5, wherein said second planetary gear mechanism is a decelerating type including a plurality of sun gears, said sun gear clutch means corresponding to said sun gears and each including a one-way clutch and breaker means for breaking drive transmission through said one-way clutch.

7. A self-contained change speed apparatus as claimed in claim 1, wherein said second planetary gear mechanism is a decelerating type including a plurality of sun gears, said sun gear clutch means corresponding to said sun gears and each including a one-way clutch and breaker means for breaking drive transmission through said one-way clutch.

8. A self-contained change speed apparatus comprising:
  a fixed shaft;
  a drive member and a hub body rotatably supported
  sun gear clutch means arranged between said sun gears and said fixed shaft, respectively, each of said sun gear clutch means including a one-way clutch and breaker means for breaking drive transmission through said one-way clutch;

control means for controlling said sun gear clutch means; and a first output one-way clutch disposed between aid hub body and said gear carrier of said second planetary gear mechanism, and a second output one-way clutch disposed between said hub body and said ring gear of said second planetary gear mechanism;

wherein an output line extending through one of said first and second one-way clutches is determined by said control means controlling said sun gear clutch means.

9. A self-contained change speed apparatus as claimed in claim 8, wherein said gear carrier of said first planetary gear mechanism is connected to said drive member, and said ring gear of said first planetary gear mechanism is connected to said gear carrier of said second planetary gear mechanism, transmission selecting means being disposed between said gear carrier of said first planetary gear mechanism and said gear carrier of said second planetary gear mechanism.

10. A self-contained change speed apparatus comprising:
(1) a fixed shaft;
(2) a drive member and a hub body rotatably supported on said fixed shaft;
(3) a first planetary gear mechanism provided in a drive transmission line defined between the drive member and the hub body, said first planetary gear mechanism being an acceleration change speed device or a reduction change speed device, said first planetary gear mechanism including:
 (a) a plurality of first sun gears supported by the fixed shaft to be moveable between a state for being rotatable about the fixed shaft and a state for being non-rotatable about the fixed shaft; and
 (b) planetary gears meshing with the first sun gears; and
(4) a control member for controlling permission and prohibition of rotation of the first sun gears about the fixed shaft through rotational displacement relative to the fixed shaft; and
(5) a second planetary gear mechanism further provided in the drive transmission line, said second planetary gear mechanism being an acceleration change speed device or a reduction change speed device, said second planetary gear mechanism including second sun gears supported by the fixed shaft to be moveable between a state for being rotatable about the fixed shaft and a state for being non-rotatable about the fixed shaft, and wherein rotational displacement of said control member controls permission and prohibition of rotation of the second sun gears about the fixed shaft.

11. A self-contained change speed apparatus as claimed in claim 10, wherein the first planetary gear mechanism and the second planetary gear mechanism produce such speeds that change speed ratios of the adjacent change speed positions are substantially equal.

12. A self-contained change speed apparatus as claimed in claim 11, wherein the first planetary gear mechanism is an acceleration change speed device and the second planetary gear mechanism is a reduction change speed device.

13. A self-contained change speed apparatus as claimed in claim 11, wherein the first and second sun gears are prohibited from rotating in only one direction about the fixed shaft through rotational displacement of the control member.

* * * * *